(12) United States Patent
Beavin (10) Patent No.: US 8,380,362 B2
(45) Date of Patent: Feb. 19, 2013

(54) SYSTEMS AND METHODS FOR REMOTELY COLLABORATIVE VEHICLES

(75) Inventor: William C. Beavin, Webster Groves, MO (US)

(73) Assignee: The Boeing Company, Chicago, IL (US)

( * ) Notice: Subject to any disclaimer, the term of this patent is extended or adjusted under 35 U.S.C. 154(b) by 634 days.

(21) Appl. No.: 12/500,935

(22) Filed: Jul. 10, 2009

(65) Prior Publication Data
US 2011/0010022 A1 Jan. 13, 2011

(51) Int. Cl.
*G06F 7/00* (2006.01)
*G06F 17/00* (2006.01)

(52) U.S. Cl. ............ 701/2; 701/470; 701/300; 701/472; 701/494; 701/408; 342/450; 342/453

(58) Field of Classification Search .......... 701/207–208, 701/213, E17.044, 408, 532, 2, 300, 494, 701/470, 472; 707/E17.019; 348/114; 342/450, 342/453
See application file for complete search history.

(56) References Cited

U.S. PATENT DOCUMENTS

| | | | |
|---|---|---|---|
| 3,659,085 A * | 4/1972 | Potter et al. | 701/518 |
| 4,703,444 A * | 10/1987 | Storms et al. | 342/463 |
| 4,831,539 A * | 5/1989 | Hagenbuch | 701/33.4 |
| 4,884,208 A * | 11/1989 | Marinelli et al. | 701/300 |
| 4,976,619 A * | 12/1990 | Carlson | 434/16 |
| 5,150,310 A * | 9/1992 | Greenspun et al. | 342/451 |
| 5,375,059 A | 12/1994 | Krystos | |
| 5,438,517 A * | 8/1995 | Sennott et al. | 701/470 |
| 5,629,855 A * | 5/1997 | Kyrtsos et al. | 701/300 |
| 5,752,218 A * | 5/1998 | Harrison et al. | 701/485 |
| 6,721,651 B1 * | 4/2004 | Minelli | 701/200 |
| 6,801,855 B1 * | 10/2004 | Walters et al. | 701/216 |
| 6,813,585 B2 * | 11/2004 | Leutz et al. | 702/158 |
| 6,924,750 B2 * | 8/2005 | Flick | 340/989 |
| 6,958,701 B1 * | 10/2005 | Storkamp et al. | 340/994 |
| 7,102,565 B2 * | 9/2006 | Jesson | 342/357.63 |
| 7,483,789 B1 * | 1/2009 | Walters et al. | 701/428 |

(Continued)

FOREIGN PATENT DOCUMENTS

| | | | |
|---|---|---|---|
| ES | 2249975 A1 * | 4/2006 | |
| FR | 2895503 A1 * | 6/2007 | |

(Continued)

OTHER PUBLICATIONS

Design of a stand alone navigation system using position estimation algorithm; Jayachandran, M. et al.; Geoscience and Remote Sensing Symposium,2009 IEEE International,IGARSS 2009; vol. 2; Digital Object Identifier: 10.1109/IGARSS.2009.5418138; Publication Year: 2009 , pp. II-539-II-542.*

(Continued)

*Primary Examiner* — Cuong H Nguyen
(74) *Attorney, Agent, or Firm* — Caven & Aghevli LLC (57) ABSTRACT

Methods and architecture systems for controlling vehicle systems are disclosed. In one embodiment, a method of remotely controlling a vehicle includes estimating a position of the vehicle. A position estimation algorithm may estimate the position of the vehicle. A position data packet received from the vehicle may be used to update the estimated position of the vehicle. A display device may display a virtual representation of the vehicle based on the updated estimated position of the vehicle. Command signals may be transmitted to the vehicle based on the displayed virtual representation of the vehicle.

4 Claims, 7 Drawing Sheets

U.S. PATENT DOCUMENTS

| | | | |
|---|---|---|---|
| RE40,642 E * | 2/2009 | Harrison et al. | 701/485 |
| 2003/0187933 A1 | 10/2003 | Beavin | |
| 2006/0235583 A1* | 10/2006 | Larsen | 701/21 |
| 2006/0271246 A1* | 11/2006 | Bell et al. | 701/1 |
| 2008/0033684 A1* | 2/2008 | Vian et al. | 702/113 |
| 2008/0180523 A1* | 7/2008 | Stratton et al. | 348/114 |
| 2009/0123100 A1 | 5/2009 | Otsuka | |
| 2011/0010022 A1* | 1/2011 | Beavin | 701/2 |

FOREIGN PATENT DOCUMENTS

| | | | |
|---|---|---|---|
| GB | 2407918 A | * | 5/2005 |
| WO | WO 9821703 A1 | * | 5/1998 |

OTHER PUBLICATIONS

Homing by acoustic ranging to a single beacon; Vaganay, J.; Baccou, P.; Jouvencel, B.; OCEANS 2000 MTS/IEEE Conference and Exhibition; vol. 2; Digital Object Identifier: 10.1109/OCEANS.2000.881809; Publication Year: 2000, pp. 1457-1462 vol. 2.*

A fault-tolerant integrated navigation method for land vehicle; Yang Bo et al.; Advanced Computer Control (ICACC), 2010 2nd International Conference on; vol. 4; Digital Object Identifier: 10.1109/ICACC.2010.5486919; Publication Year: 2010, pp. 432-435.*

ADDR-GPS data fusion using Kalman filter algorithm; Rajaduraimanickam, K.; Shanmugam, J.; Anitha, G.; Digital Avionics Systems Conference, 2005. DASC 2005. The 24th vol. 2; Digital Object Identifier: 10.1109/DASC.2005.1563447; Publication Year: 2005.*

Integration of GPS and dead-reckoning navigation systems; Wei-Wen Kao; Vehicle Navigation and Information Systems Conference, 1991; vol. 2; Digital Object Identifier: 10.1109/VNIS.1991.205808; Publication Year: 1991, pp. 635-643.*

Cascaded Kalman Filters for Accurate Estimation of Multiple Biases, Dead-Reckoning Navigation, and Full State Feedback Control of Ground Vehicles; David M. Bevly; Bradford Parkinson; Control Systems Technology, IEEE Transactions on vol. 15, Issue: 2; Digital Object Identifier: 10.1109/TCST.2006.883311; Pub. Yr: 2007, pp. 199-208.*

A Fuzzy Logic Map Matching Algorithm; Yongqiang Zhang; Yanyan Gao; Fuzzy Systems and Knowledge Discovery, 2008. FSKD '08. Fifth International Conference on; vol. 3; Digital Object Identifier: 10.1109/FSKD.2008.234 Publication Year: 2008, pp. 132-136.*

On reverse navigation algorithm and its application to SINS gyrocompass in-movement alignment; Yan Gongmin; Yan Weisheng; Xu Demin; Control Conference, 2008. CCC 2008. 27th Chinese; Digital Object Identifier: 10.1109/CHICC.2008.4605437; Publication Year: 2008, pp. 724-729.*

Design of an Extended Kalman Filter for UAV Localization; Guoqiang Mao; Drake, S.; Anderson, B.D.O.; Information, Decision and Control, 2007. IDC '07; Digital Object Identifier: 10.1109/IDC.2007.374554; Publication Year: 2007, pp. 224-229.*

Using GPS at sea to determine the range between a moving ship and a drifting buoy to centimeter-level accuracy; Doutt, J.A.; Frisk, G.V.; Martell, H.; OCEANS '98 Conference Proceedings; vol. 3; Digital Object Identifier: 10.1109/OCEANS.1998.726287 Publication Year: 1998, pp. 1344-1347 vol. 3.*

A weighted clustering algorithm for clarifying vehicle GPS traces; Jing Wang; Xiaoping Rui; Xianfeng Song; Chaoling Wang; Lingli Tang; Chuanrong Li; Raghvan, V.; Geoscience and Remote Sensing Symposium (IGARSS), 2011 IEEE International Digital Object Identifier: 10.1109/IGARSS.2011.6049834; Publication Year: 2011, pp. 2949-2952.*

Embedded sensor system and techniques to evaluate the comfort in public transportation; Castellanos, J.C.; Susin, A.A.; Fruett, F. Intelligent Transportation Systems (ITSC), 2011 14th International IEEE Conference on; Digital Object Identifier: 10.1109/ITSC.2011.6083051; Publication Year: 2011, pp. 1858-1863.*

International Search Report mailed Nov. 16, 2011.

"IEEE Standard for Information Technology—Protocols for Distributed Interactive Simulation Applications", Entity Information and Interaction, Mar. 1993, Standards Coordinating Committee, IEEE 1278-1993, 64 pgs.

"IEEE Standard for Modeling and Simulation (M&S) High Level Architecture (HLA)—Framework and Rules", Sep. 2000, Simulation Interoperability Standards Committee, IEEE 1516-2000, 27 pgs.

SAE Aerospace, Aerospace Information Report, "JAUS History and Domain Model", Technical Standards, Mar. 2006, AIR5664, 23 pgs.

SAE Aerospace, Aerospace Information Report, "JAUS Transport Considerations", Technical Standards, Dec. 2007, AIR5645, 31 pgs.

McCarty et al., "A Virtual Cockpit for a Distributed Interactie Simulation", IEEE Computer Graphics and Application, vol. 14, Issue 1, Jan. 1994, pp. 49-54.

SEDRIS Technologies, Jun. 2009, retrieved Aug. 20, 2009 at http://www.sedris.org, 1 pg.

"The MPEG Home Page", retrieved on Aug. 20, 2009 at http://www.chiariglione.org/mpeg, 1 pg.

Wikipedia, "MPEG-4", Aug. 2009, retrieved on Aug. 20, 2009 from http://en.wikipedia.org/wiki/NPEG-4, 4 pgs.

* cited by examiner

SYSTEMS AND METHODS FOR REMOTELY COLLABORATIVE VEHICLES

TECHNICAL FIELD

The present disclosure pertains to remotely collaborative vehicles, and more specifically, systems and methods for remotely collaborative vehicles.

BACKGROUND

Remotely collaborative vehicle systems are becoming increasingly valuable due to their ability to engage in missions ranging from reconnaissance and intelligence-gathering to attack missions. One architecture often used to control remote vehicle systems involves streaming live video from the vehicle to an operator platform. The operator views the video feed and sends commands back to the vehicle based on the viewed video feed. Although such architecture ideally allows a remote operator to view the actual environment in which the vehicle is operating in real time, this architecture often has unmanageable latency issues and requires a significant amount of bandwidth such that real time operation is significantly hampered.

Latency is a time delay, such as the time that it takes a vehicle to capture, encode and send a video stream from the vehicle to the remote operator, plus the time that it takes for the operator to provide a control input, as well as the time it takes for the vehicle to receive and respond to the control input from the remote operator. Latency can produce undesirable effects, such as causing a vehicle to divert from a desired trajectory. For example, during a surveillance mission, if a vehicle sends a video feed with a delay of five seconds, when it is two seconds away from a desired surveillance point it will be too late for the operator to observe the latent video and provide a control input to be executed when the vehicle passes over the surveillance point. As a result, the operator will continuously be trying to compensate for the delay rather than operating the vehicle real time.

Another example of the impact of latency is when a vehicle measures its location and orientation, such as with a Global Positioning System (GPS) augmented with an Inertial Navigation Unit (INU). The kinematic status data, such as the vehicle's location, orientation, velocities, and accelerations are valid for the precise moment when they were obtained, but by the time that data is transmitted and observed by an operator the momentum of the vehicle will have carried it beyond the reported location. So, the operator will provide control inputs based on old kinematic data, not necessarily based on the state of the vehicle at the precise moment the control inputs were generated. This can cause undesirable effects such as pilot induced oscillation. Kinematic data latency can also hamper collaboration between the vehicles. For example, in a swarm of vehicles flying in close formation, the vehicles may exchange kinematic data with each other so that their control systems may continually adjust to maintain the desired formation. However, if there is latency associated with the kinematic data each vehicle's control systems will be basing their calculations on old kinematic data, not necessarily on data representing the status of other vehicles at the moment the calculations are being performed. Impacts of kinematic data latency could include needing to space the vehicles further from each other in the formation than would be desired to compensate for the effects of kinematic data latency or risk collisions between the vehicles or with objects in the environment.

In addition to latency, video streaming architectures also often require a significant amount of bandwidth. A high quality video stream could require one megabit per second or more of bandwidth. Such bandwidth is often taxing on the communication links between vehicles and remote operators. Multiple unmanned vehicle systems may operate collaboratively, such as in a swarm. Multiple video streams can increase the amount of bandwidth required to an unmanageable size.

An alternative architecture for remotely controlling vehicle systems involves compressing the video streams to reduce the bandwidth requirements. Although compressing the video streams advantageously reduces the bandwidth requirements, the compression and decompression overhead for such architecture may add several seconds or more to the latency. This added latency may make it difficult to remotely control the vehicle.

Another alternative architecture for remotely controlling vehicle systems involves tethering the vehicle to the remote operator. Tethering the vehicle advantageously provides a direct communication link between the vehicle and the operator and can provide sufficient bandwidth with minimal latency to enable effective operation of the tethered vehicle. However, in such an architecture, the mission of the tethered vehicle is limited to the length of the tether which greatly limits the types of missions that the vehicle is able to perform, as well as limits the ability of vehicles and operators to collaborate with others.

SUMMARY

Methods and architecture systems for controlling vehicle systems are disclosed. In one embodiment, a method of remotely controlling a vehicle includes estimating a position of the vehicle. A position estimation algorithm may estimate the position of the vehicle. A position data packet received from the vehicle may be used to update the estimated position of the vehicle. A display device may display a virtual representation of the vehicle based on the updated estimated position of the vehicle. Command signals may be transmitted to the vehicle based on the displayed virtual representation of the vehicle.

In another embodiment, a method of communicating a vehicle's position includes estimating a position of the vehicle and acquiring an actual position of the vehicle. If the difference between the estimated position and the actual position of the vehicle is greater than a threshold value, then a position data packet including orientation and kinematic vehicle data may be generated and transmitted from the vehicle.

In another embodiment, a remotely operable vehicle system architecture may include a remotely operable vehicle and a remote operator. The remotely operable vehicle may include an estimated position module to estimate a position of the vehicle. The remotely operable vehicle may also include an acquired position module to acquire an actual position of the vehicle. When the difference between the estimated and actual position of the vehicle is greater than a position deviation threshold then a position data packet may be generated and communicated. The remote operator platform may include an estimated position module, a position update module, a display module, and a command module. The operator based estimated position module may estimate the position of the vehicle. The position update module may update the estimated position of the vehicle when the position data packet is communicated from the vehicle. The display module may display a virtual representation of the vehicle on a display device based on the updated estimated position of the vehicle. The command module may communicate one or more operational commands to the vehicle.

In another embodiment, a remotely operable vehicle system architecture may include at least two remotely operable vehicles that collaborate. The vehicles may include an estimated position module, an acquired position module, a communications module, a position update module, a command module, and a control module. The estimated position module may estimate a position of each of the at least two remotely operable vehicles that collaborate. Each of the remotely operable vehicles may obtain their actual position via the acquired position module. The communications module monitors the difference between the estimated and actual position of each vehicle, and when the difference is greater than a position deviation threshold, the communications module may communicate a position data packet to each of the collaborating remotely operable vehicles. The position update module may update the estimated position of each collaborating remotely operable vehicles based on the position data packet. The command module that may receive one or more operational commands from a remote operator or exchange operational commands with other vehicles. The control module may utilize the vehicle estimated positions and a virtual representation of the environment to control the vehicle functions.

The features, functions, and advantages may be independently achievable in various embodiments of the present disclosure or combinable in yet other embodiments.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Overview

As discussed above, latency and bandwidth issues related to streaming live video greatly hinders the ability to remotely control vehicle systems accurately. Improved techniques to control vehicles remotely without the need to transmit live streaming video are disclosed herein. Some techniques include using a predefined positioning algorithm to estimate a position of the vehicle. Such predefined positioning algorithm may estimate the position of the vehicle without requiring any live streaming video as input. Other techniques involve communicating actual position data from the vehicle system only when an estimated position of the vehicle differs from the actual position of the vehicle by at least a predetermined threshold. A visualization of the vehicle functioning in its operational environment may be displayed without streaming a live video from the vehicle by displaying a virtual representation of the vehicle along with virtual representations of the environment in which the vehicle is operating. Vehicles that may implement the techniques disclosed herein include without limitation, aircraft, maritime vessels, spacecraft, motor vehicles, mechanical devices, and other vehicles or systems which are remotely controllable.

Figure 1:
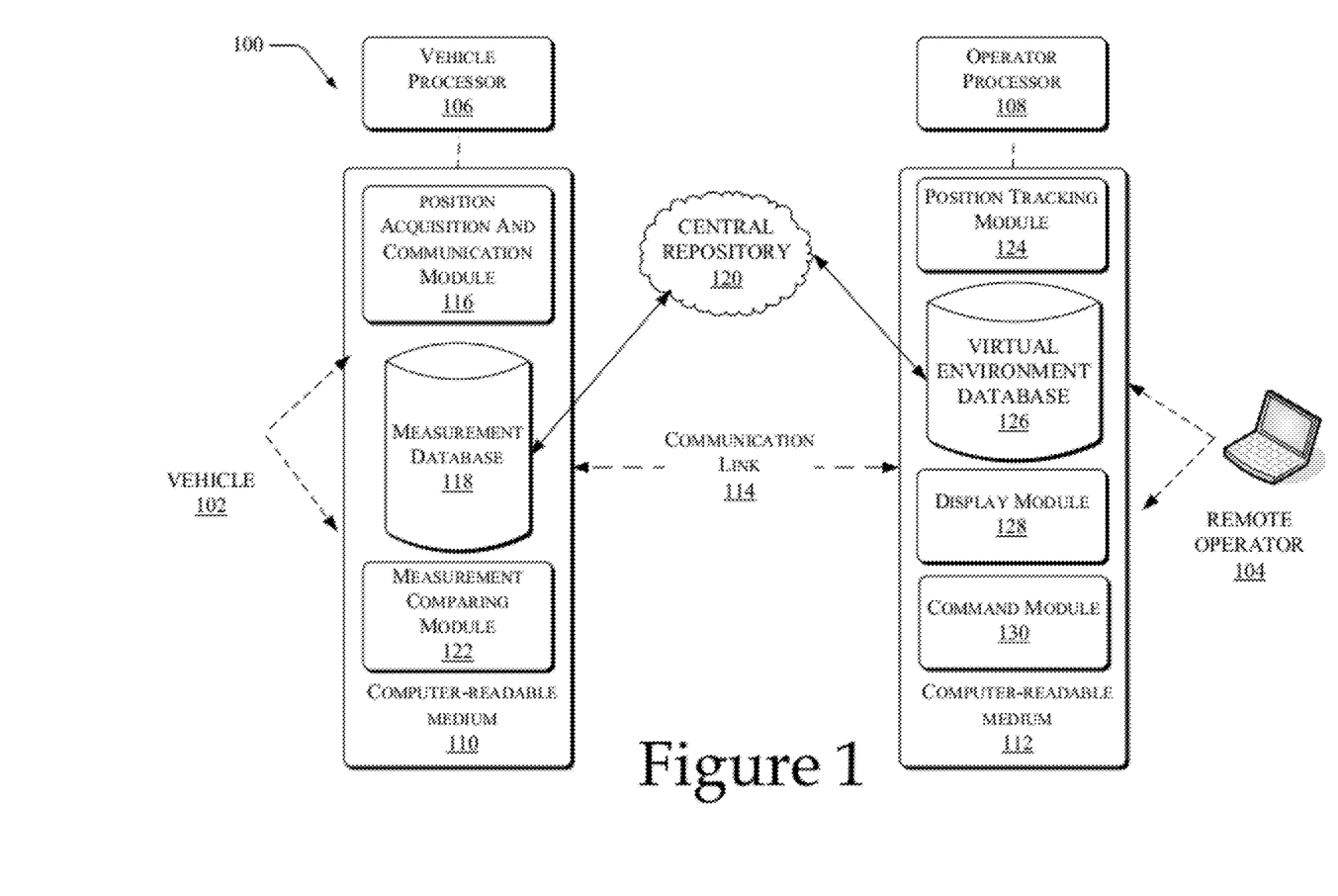
FIG. 1 is a combined block and flow diagram of a system architecture for remotely controllable vehicles.

FIG. 1 illustrates a system architecture 100 for remotely controllable vehicles. The system architecture 100 may include a remotely operable vehicle 102 and a remote operator 104. The remotely operable vehicle 102 may be any vehicle that is remotely controllable such as aircraft, maritime vessels, spacecraft, motor vehicles, or the like. It is understood that implementations of the system architecture 100 may include any number of similar or different vehicles, although FIG. 1 only shows one aircraft vehicle for convenience of illustration.

In general, the remotely operable vehicle 102 and the remote operator 104 may be computer-based systems that include one or more processor(s). FIG. 1 shows a vehicle processor 106 associated with the remotely operable vehicle 102 and an operator processor 108 associated with the remote operator 104. The remotely operable vehicle 102 and remote operator 104 may include one or more instances of computer-readable storage media, which are coupled to communicate with the processors. As illustrated in FIG. 1, the remotely operable vehicle 102 may include a vehicle computer-readable media 110 and the remote operator 104 may include an operator computer-readable media 112. The computer-readable media 110 and 112 may contain instructions that, when executed by the processor, perform any of the tools or related functions as described herein. The processor may be configured to access and/or execute the instructions embedded or encoded onto the computer-readable media 110 and 112. The processor may also be categorized or characterized as having a given architecture. The processors may be different types of processors, depending on the architecture of the remotely operable vehicle 102. It is understood that the vehicle 102 may be distributed, for example the vehicle processor 106 and associated modules may be off-board from the vehicle platform, such as on the ground, and use remote tracking systems such as Laser, LED, Infrared, Ultrasound, RF Tag, or Electromagnetic to track the vehicle platform when conditions such as weight and power limitations on the vehicle platform require a distributed vehicle system configuration.

A communication link 114 may enable two-way communication between the remotely operable vehicle 102 and the remote operator 104. Although only one communication arrow is shown, multiple communication links may be provided. In one implementation, the communication link 114 may enable the remotely operable vehicle 102 to communicate with the remote operator 104 without the communications passing through an intermediate network. Examples of technologies suitable for implementing such communications include, but are not limited to, Bluetooth and WiFi technologies. In an alternative implementation, the communication link 114 may enable the remotely operable vehicle 102 to communicate with the remote operator 104 through some intermediate network or service provided and/or through some service maintained by a third party.

Although only one vehicle is shown in FIG. 1, if multiple vehicles are provided, then the communication link 114 may enable communication between the various vehicles as well as with the remote operator 104.

The vehicle computer-readable media 110 may include a position acquisition and communication module 116 to acquire and communicate a position of the vehicle. As described further below with reference to FIG. 2, the position acquisition and communication module 116 advantageously eliminates the need to stream live video from the remotely operable vehicle 102. For example, the position acquisition and communication module 116 communicates a position of the remotely operable vehicle 102 only when an actual position of the remotely operable vehicle 102 differs from an estimated position of the remotely operable vehicle 102 by more than a threshold value. The position acquisition and communication module 116 may be implemented as one or more software modules that, when loaded into the vehicle processor 106 and executed, cause the remotely operable vehicle 102 to perform the various functions described herein.

The vehicle computer-readable media 110 may also include one or more instances of a vehicle measurement database 118 to store measurements of an environment. The vehicle measurement database 118 may be preloaded into the vehicle computer readable medium or it may be downloaded from a central repository 120. During operation, the remotely operable vehicle 102 may use one or more range sensors (not shown) to sense environmental measurements. A measurement comparing module 122 may compare the sensed environmental measurements to the one or more measurements of the vehicle measurement database 118. If the remotely operable vehicle 102 senses an environmental measurement that does not correlate with the vehicle measurement database 118, then the range sensors may update the vehicle measurement database 118 to correlate with the sensor measurement.

For example, a range sensor (not shown) may indicate the range to the surface of the terrain along the azimuth and elevation angle of the range sensor is 37 meters, but the range along that same azimuth and elevation in the vehicle measurement database may indicate the distance to the surface of the terrain is 40 meters, so the two ranges don't correlate and if the vehicle location and sensor orientation is accurate then the actual terrain must have a higher elevation at that point that the vehicle measurement database has stored away for that location. So, a point may be inserted into the terrain elevation database reflecting the most currently available data for the terrain contours for that location. Additional range measurements taken in the same vicinity will provide additional data points that can provide a very accurate representation of the terrain in the vehicle measurement database. There are numerous insertion methods that may be used, such as to add more surface polygons if the database system can support additional detail, or modify the coordinates associated with existing surface polygons to reflect the more timely terrain surface data if the database system can not accept additional surface details.

In another example, the range sensors may include an image capturing device (not shown). The measurement comparing module 122 may compare images of the environment captured from the image capturing device to one or more images stored in the vehicle measurement database 118. In one implementation, the measurement comparing module 122 compares the real-world captured images of the environment to one or more real-world captured images stored in the vehicle measurement database 118. Alternatively, the measurement comparing module 122 may compare the real-world captured images of the environment to one or more virtual representation images stored in the vehicle measurement database 118. If the captured image differs from the images in the vehicle measurement database 118 or if the captured image is not present in the vehicle measurement database 118, the remotely operable vehicle 102 may store the captured image to the vehicle measurement database 118. In one implementation, the remotely operable vehicle 102 stores the captured image to the vehicle measurement database 118 as a real-world image. Alternatively, the remotely operable vehicle 102 stores a virtual representation of the captured image to the vehicle measurement database 118 based on the position and orientation of the range sensor and the intersection with objects within the sensor field of view along the line-of-sight. Alternatively, the remotely operable vehicle 102 may store both a real-world image as well as a virtual representation of the captured image to the vehicle measurement database 118.

Regardless of the type of measurement stored, once the remotely operable vehicle 102 updates the vehicle measurement database 118, the remotely operable vehicle 102 may update the central repository 120 to reflect the newly added measurements. In one implementation, the remotely operable vehicle 102 may send a repository update message to notify other platforms that the central repository 120 contains updated measurements. For example, the remotely operable vehicle 102 may send the repository update message to the remote operator 104. The remotely operable vehicle 102 may send the repository update message to the remote operator 104 via the communication link 114. Alternatively, the remotely operable vehicle 102 may send the repository update message to the remote operator 104 via a communication technique other than the communication link 114. Although only one vehicle is shown in FIG. 1, if multiple vehicles are provided, then the remotely operable vehicle 102 may send the repository update message to the other vehicles in addition to or instead of sending the repository update message to the remote operator 104.

With continuing reference to FIG. 1, the operator computer-readable media 112 may include a position tracking module 124. As described further below with reference to FIG. 3, the position tracking module 124 tracks the position of the remotely operable vehicle 102 without the need to stream live video from the remotely operable vehicle 102. One or more software modules may implement the position tracking module 124 such that, when loaded into the vehicle processor 106 and executed, the remote operator 104 performs the various functions described herein.

The operator computer-readable media 112 may also include one or more instances of a virtual environment database 126 to store measurements of vehicle's operational environment. The virtual environment database 126 may be preloaded into the operator computer readable medium or it may be downloaded from the central repository 120. During operation, the remote operator 104 may update the virtual environment database 126 by downloading data from the central repository 120. For example, the remote operator 104 may download data from the central repository 120 during operation upon receiving the repository update message from the remotely operable vehicle 102 as discussed above.

The operator computer-readable media 112 may additionally include a display module 128 to display a virtual representation of the remotely operable vehicle 102 on a display device (not shown). The display module 128 may display the virtual representation of the remotely operable vehicle 102 based on the position of the remotely operable vehicle 102 as determined via the position tracking module 124. In addition, the display module 128 may retrieve one or more measurements from the virtual environment database 126 to display on the display device along with the virtual representation of the remotely operable vehicle 102. For example, the display module 128 may retrieve the one or more measurements of vehicle's operational environment to display based on the position of the remotely operable vehicle 102 as indicated via the position tracking module 124.

Displaying a virtual representation of the remotely operable vehicle 102 along with virtual representations of the vehicle's operational environment advantageously enables the display device to display the remotely operable vehicle 102 without the need to stream live video from the remotely operable vehicle 102. In addition, the display module 128 advantageously enables the display device to display the remotely operable vehicle 102 from any perspective. For example, the display device may display the remotely operable vehicle 102 from afar for a situational awareness view, over the shoulder, or from a perspective onboard the remotely operable vehicle 102 such as a virtual "pilot".

Although only one vehicle is shown in FIG. 1, multiple vehicles may be provided. If multiple vehicles are provided, the display module 128 may display one or more of the multiple vehicles together on the display device at the same time. Alternatively, a plurality of display devices may display the multiple vehicles.

With continuing reference to FIG. 1, the operator computer-readable media 112 may additionally include a command module 130 to transmit one or more operational commands to the remotely operable vehicle 102. In one implementation, a user of the display device manually inputs one or more commands for the command module 130 to transmit to the remotely operable vehicle 102. For example, a user of the display device may transmit control commands to turn, bank, and/or accelerate, the remotely operable vehicle. In an alternative implementation, an automatic technique provides the one or more commands to the command module 130 for transmission to the remotely operable vehicle 102.

In one implementation, the command module 130 transmits the commands to the remotely operable vehicle 102 via the communication link 114. Although only one vehicle is shown in FIG. 1, multiple vehicles may be provided. If multiple vehicles are provided, the command module 130 may transmit commands to one or more of the multiple vehicles. In one implementation, the command module 130 transmits one or more similar commands to multiple vehicles such that the multiple vehicles move in synchronicity with one another. Alternatively, the command module 130 may transmit unique commands to each of the multiple vehicles to control each of the multiple vehicles independently. These types of commands could include those to directly steer the vehicle, update a set of waypoints to follow, or updates to rule sets the vehicle may use for autonomous or collaborative decision making.

One or more software modules may implement the display module 128 and the command module 130 such that, when loaded into the remote operator processor 108 and executed, the remote operator 104 performs the various functions described herein.

Position Acquisition and Communication Module

Figure 2:
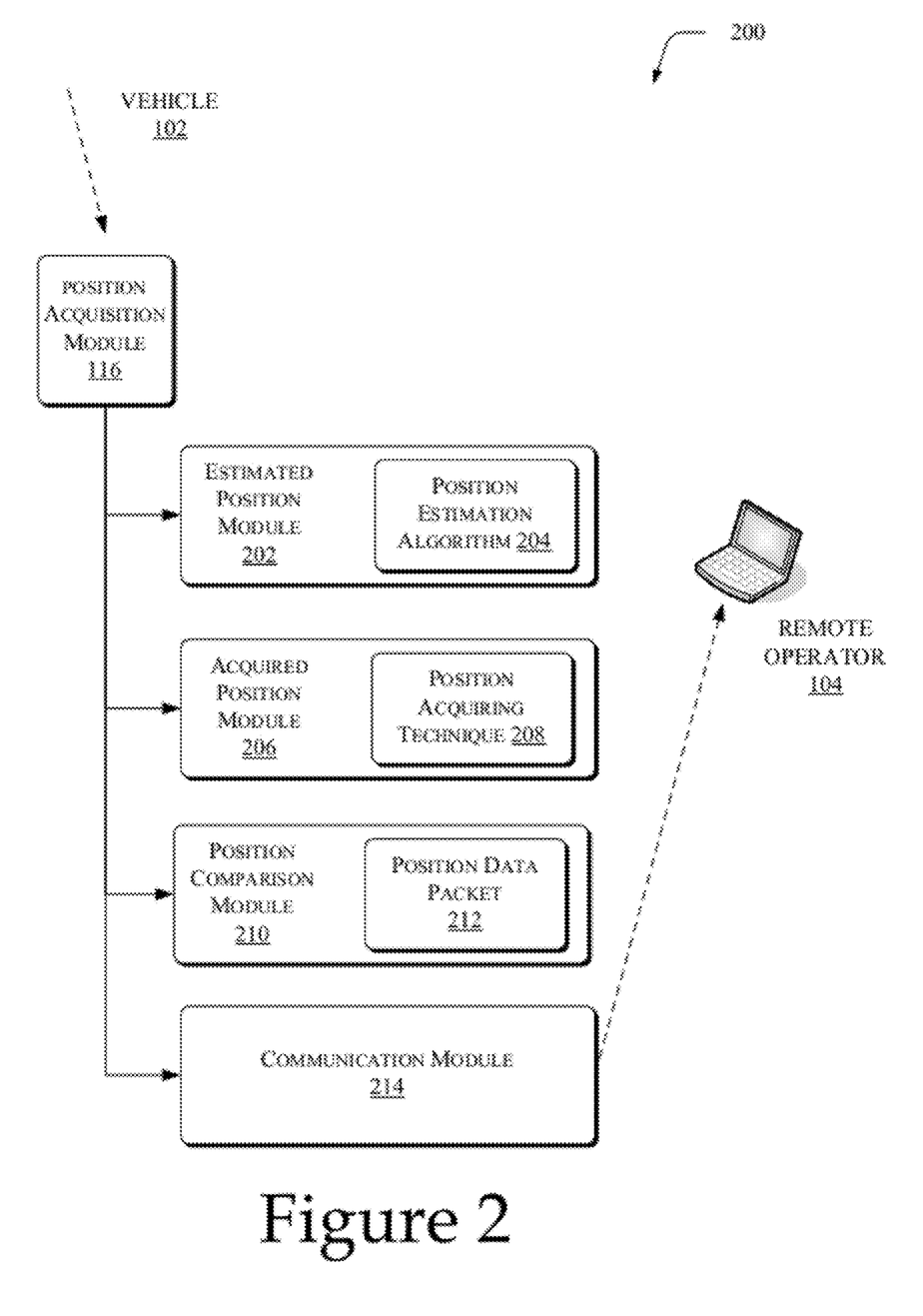
FIG. 2 is a block diagram illustrating further details of position acquisition modules for a remotely operable system.

FIG. 2 illustrates further details 200 of a position acquisition and communication module 116 for remotely operable vehicles. As noted above, the position acquisition and communication module 116 repeatedly acquires a position of the remotely operable vehicle 102, but communicates a position of the remotely operable vehicle 102 only when an actual position of the remotely operable vehicle 102 differs from an estimated position of the remotely operable vehicle 102 by more than a threshold value.

As shown in FIG. 2, the position acquisition and communication module 116 may include a vehicle based estimated position module 202 which may utilize a position estimation algorithm 204 to estimate the position of a vehicle. The position acquisition and communication module 116 may further include an acquired position module 206 which may utilize a position acquiring technique 208 to acquire an actual position of the vehicle. The position acquisition and communication module 116 may further include a position comparison module 210 to generate a position data packet 212 based on a comparison of the estimated and actual positions of the vehicle. The position acquisition and communication module 116 may further include a communication module 214 to communicate the position data packet.

With reference to the vehicle based estimated position module 202, any position estimation algorithm 204 may be used to estimate the position of a vehicle. In one non-limiting implementation, the position estimation algorithm 204 may use a dead reckoning algorithm to estimate the position of the remotely operable vehicle 102. In such an implementation, the dead reckoning algorithm may estimate the remotely operable vehicle's position based on orientation and kinematic data obtained from the vehicle. In one implementation, the vehicle based estimated position module 202 continuously estimates the position of the remotely operable vehicle 102.

With reference to the acquired position module 206, any position acquisition technique 208 may be used to acquire a position of the vehicle. In one non-limiting implementation, the position acquisition technique 208 may use a Global Positioning System (GPS) technique to acquire the position of the vehicle.

With continuing reference to FIG. 2, the position comparison module 210 may compare the estimated position to the acquired position. If the difference between the estimated position and the acquired position is greater than an agreed upon threshold, then the position comparison module 210 may generate a position data packet 212. In one implementation, the position data packet 212 may include current orientation and kinematic data of the vehicle including linear and rotational velocity and acceleration data. The position data packet 212 may further include a time stamp reflecting the time that the position data packet 212 is intended to represent. This could be the current time of the position comparison module generating the data packet, but it could also include a lookahead time differential so that the position data packet represents a position of the vehicle slightly in the future of when it was generated to compensate for transmission delays in reaching the recipient, such as remote operator 104.

Upon generation of the position data packet 212, the position acquisition and communication module 116 may communicate the position data packet at 214. In one implementation, the position acquisition and communication module 116 communicates the position data packet at 214 to the remote operator 104 of FIG. 1 via the communication link 114 (FIG. 1). If multiple vehicles are provided, the position acquisition and communication module 116 may communicate the position data packet to one or more other vehicles at 214. For example, the position acquisition and communication module 116 may communicate the position data packet at 214 to the one or more other vehicles along with communicating the position data packet to the remote operator.

Position Tracking Module

Figure 3:
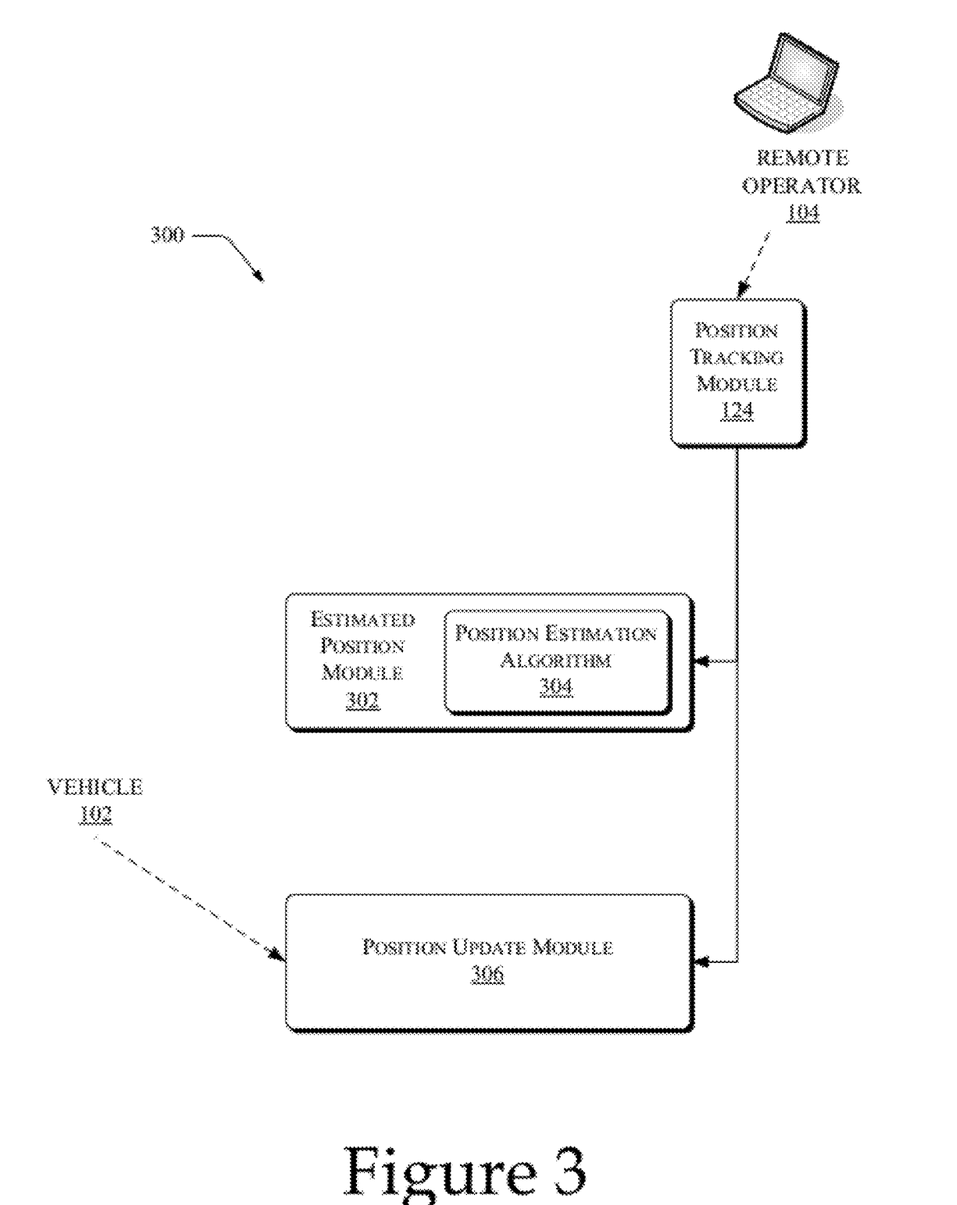
FIG. 3 is a block diagram illustrating further details of position tracking modules for a remotely operable system.

FIG. 3 illustrates further details 300 of a position tracking module 124 for implementing a system architecture to remotely control vehicles. As noted above, the position tracking module 124 tracks the position of the remotely operable vehicle 102 without the need to stream live video from the remotely operable vehicle 102.

As shown in FIG. 3, the position tracking module 124 may contain an operator based estimated position module 302. The operator based estimated position module 302 may utilize a position estimation algorithm 304 to estimate the position of the remotely operable vehicle 102. In one implementation, the operator based estimated position module 302 utilizes the same algorithm to estimate the position of the remotely operable vehicle 102 as the vehicle based estimated position module 202 described with reference to FIG. 2. For example, both the vehicle based estimated position module 202 and the operator based estimated position module 302 may contain the same dead reckoning algorithm to estimate the position of the remotely operable vehicle 102. Using the same position estimating algorithm in both estimated position modules 202 and 302 advantageously enables a display module to display an accurate representation of the remotely operable vehicle 102 in its operational environment.

The position tracking module 124 may include a position update module 306 to update the tracked position of the remotely operable vehicle. In one implementation, the position update module 306 may update the tracked position of the remotely operable vehicle by updating the variables of the position estimation algorithm 304. For example, the position update module 306 may update the variables of the estimated vehicle position algorithm based on position and orientation data stored in a position data packet received from the remotely operable vehicle 102. As discussed above with reference to FIG. 2, the position acquisition and communication module 116 of the remotely operable vehicle 102 may transmit a position data packet 212 including position, orientation, and time stamp data to the remote operator 104 when the difference between the remotely operable vehicle's estimated position and the remotely operable vehicle's acquired position is greater than the agreed upon error.

The position update module 306 may further update the tracked position of the remotely operable vehicle based on the time stamp of the position data packet 212 received from the remotely operable vehicle 102. For example, the position update module 306 may extrapolate the data stored in the position data packet 212 based on any differences between the time stamp of the position data packet (i.e., the time for which the position data packet is valid) and the time the position data packet is received by the position tracking module 124. In an example where the position data packet is generated using a lookahead time value that matches the data distribution latency, the time and position of the position data packet should closely match the time and position in the estimated position module 302. Note that the position data packet 212 may have been generated because the vehicle's position comparison module 210 indicated that enough error had accumulated in the position estimation algorithm 204 to have exceeded an agreed upon error criteria threshold, so an updated position would be needed by the remote operator position tracking module 124, especially if it was using the same position estimating algorithm 304 as the vehicle 102 was using as its position estimation algorithm 204, so its accumulated error would likely be nearing or exceeding the agreed upon error criteria threshold as well.

Figure 7:
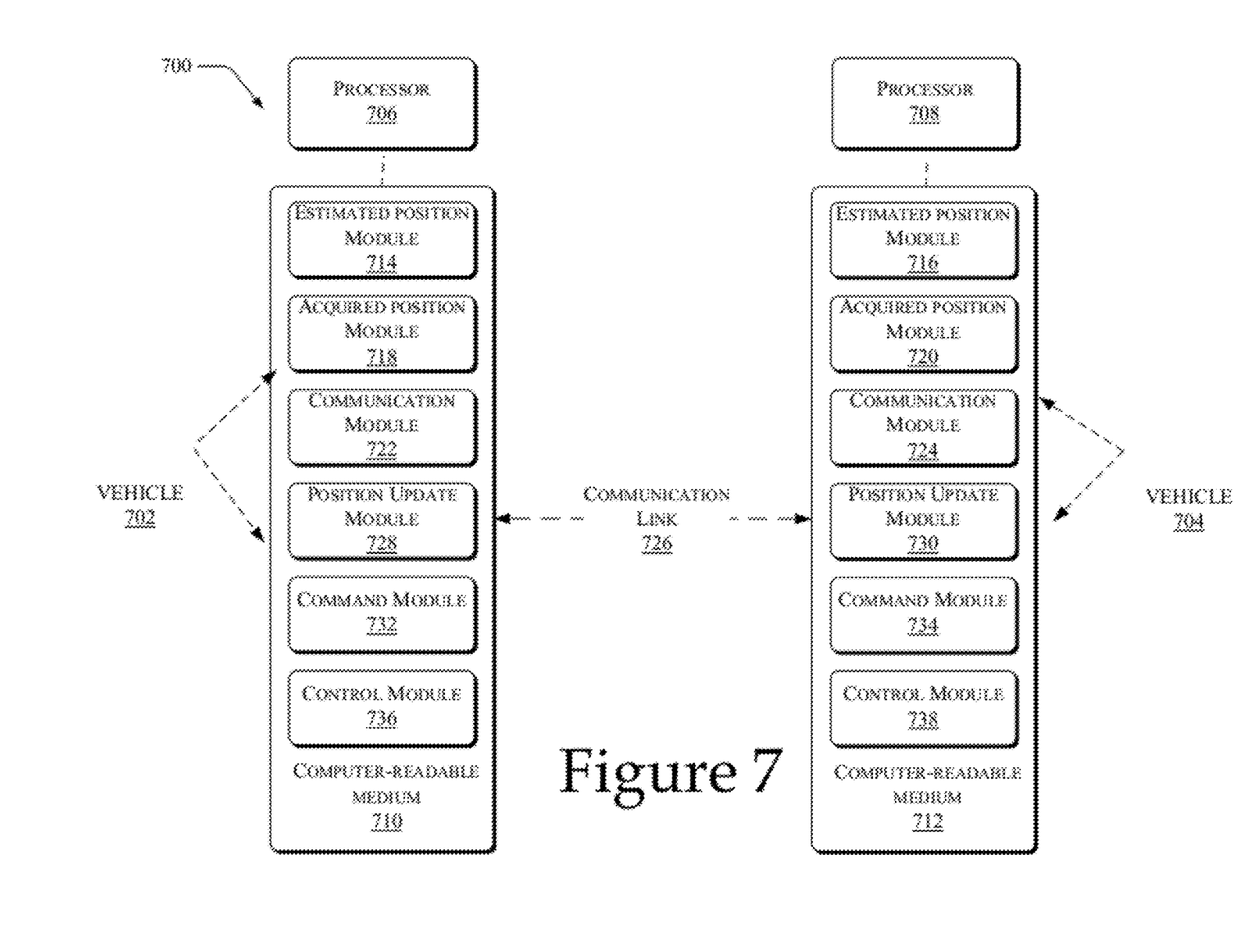
FIG. 7 is a combined block and flow diagram of a system architecture for collaboratively controlling multiple remotely controllable vehicles.

Although only one vehicle is shown in FIG. 3, multiple vehicles may be provided. If multiple vehicles are provided, the position update module 306 may track the position of one or more of the multiple vehicles. In one implementation, all of the multiple vehicles may utilize the same algorithm to transmit their position data packets 212 such that all of the remotely operable vehicles and all of the operators are aware of the exact positions of all of the other remotely operable vehicles. In such an implementation, the various operators may control virtually any remote vehicle and plan and coordinate collaborative missions among multiple vehicles. Alternatively, the multiple vehicles may be aware of the positions of the other vehicles such that the remotely operable vehicles themselves may conduct collaborative operations without intervention from the operator. FIG. 7 below illustrates a system architecture to conduct such collaborative operations.

In one implementation, the operator based estimated position module 302 continuously estimates the position of the remotely operable vehicle such that the display module continuously updates the displayed virtual representation of the remotely operable vehicle.

Illustrative Process

Figure 4:
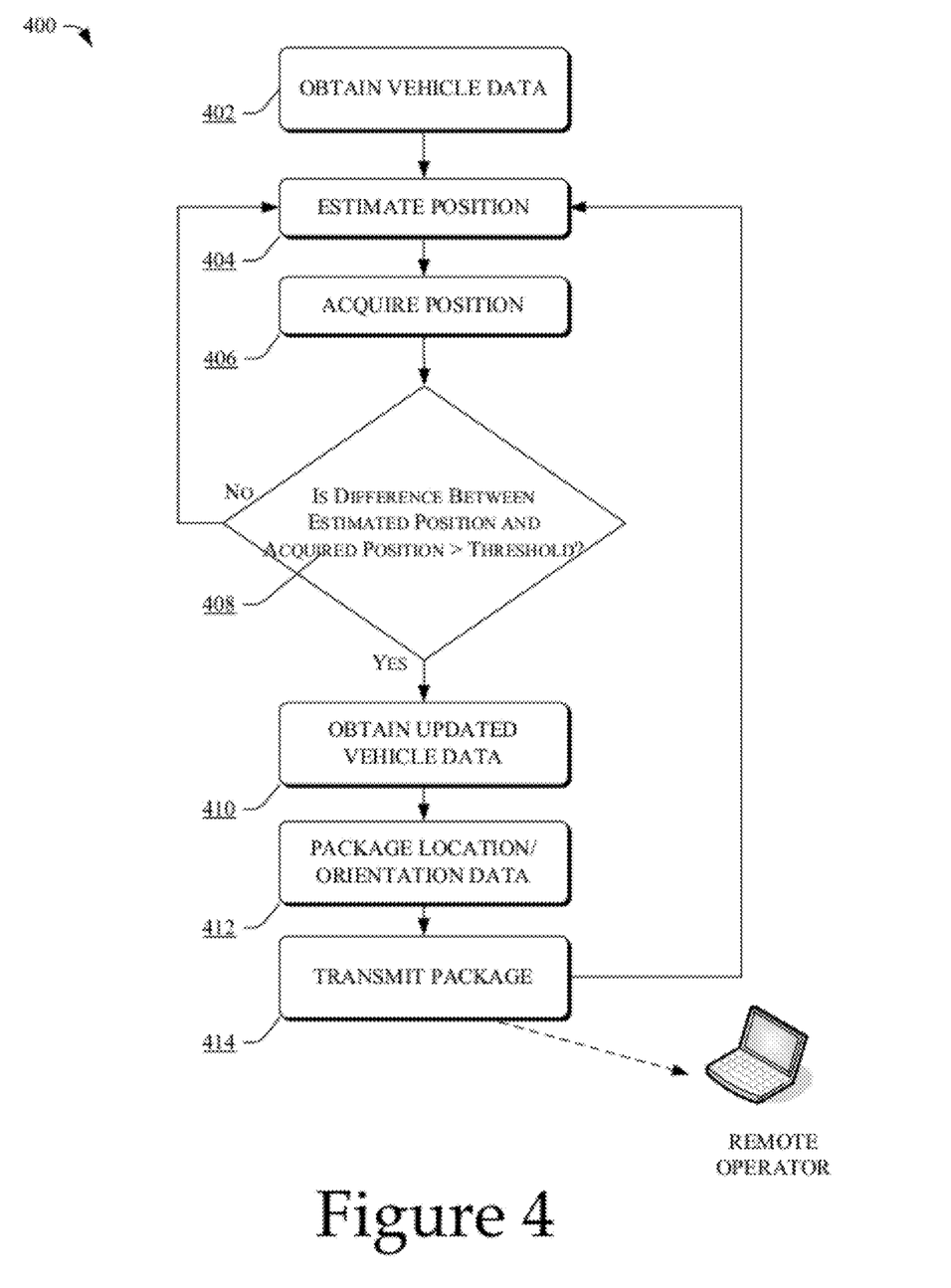
FIG. 4 is a flow diagram illustrating a process for communicating a position of a vehicle.
Figure 5:
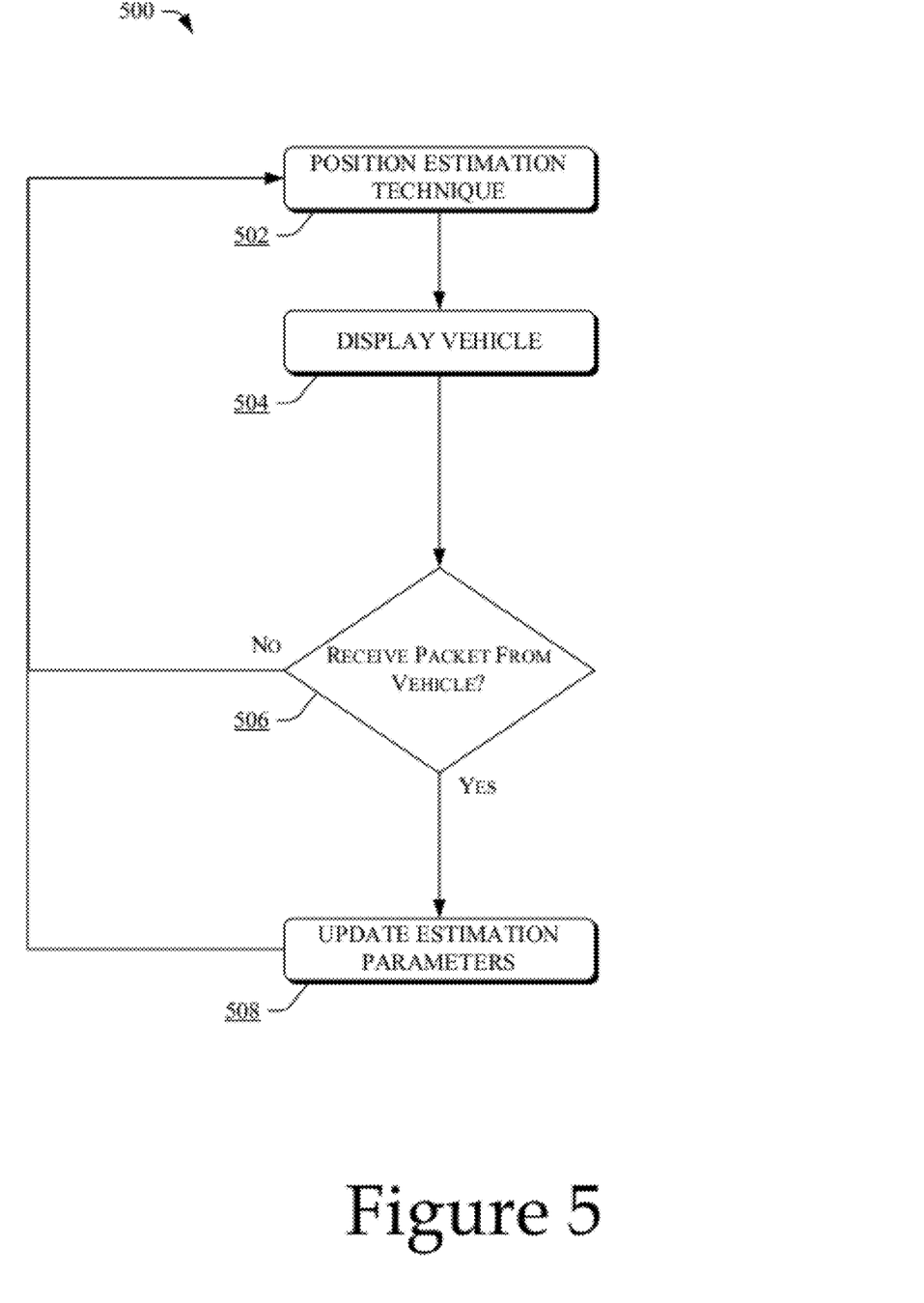
FIG. 5 is a flow diagram illustrating a process for displaying a position of a vehicle.
Figure 6:
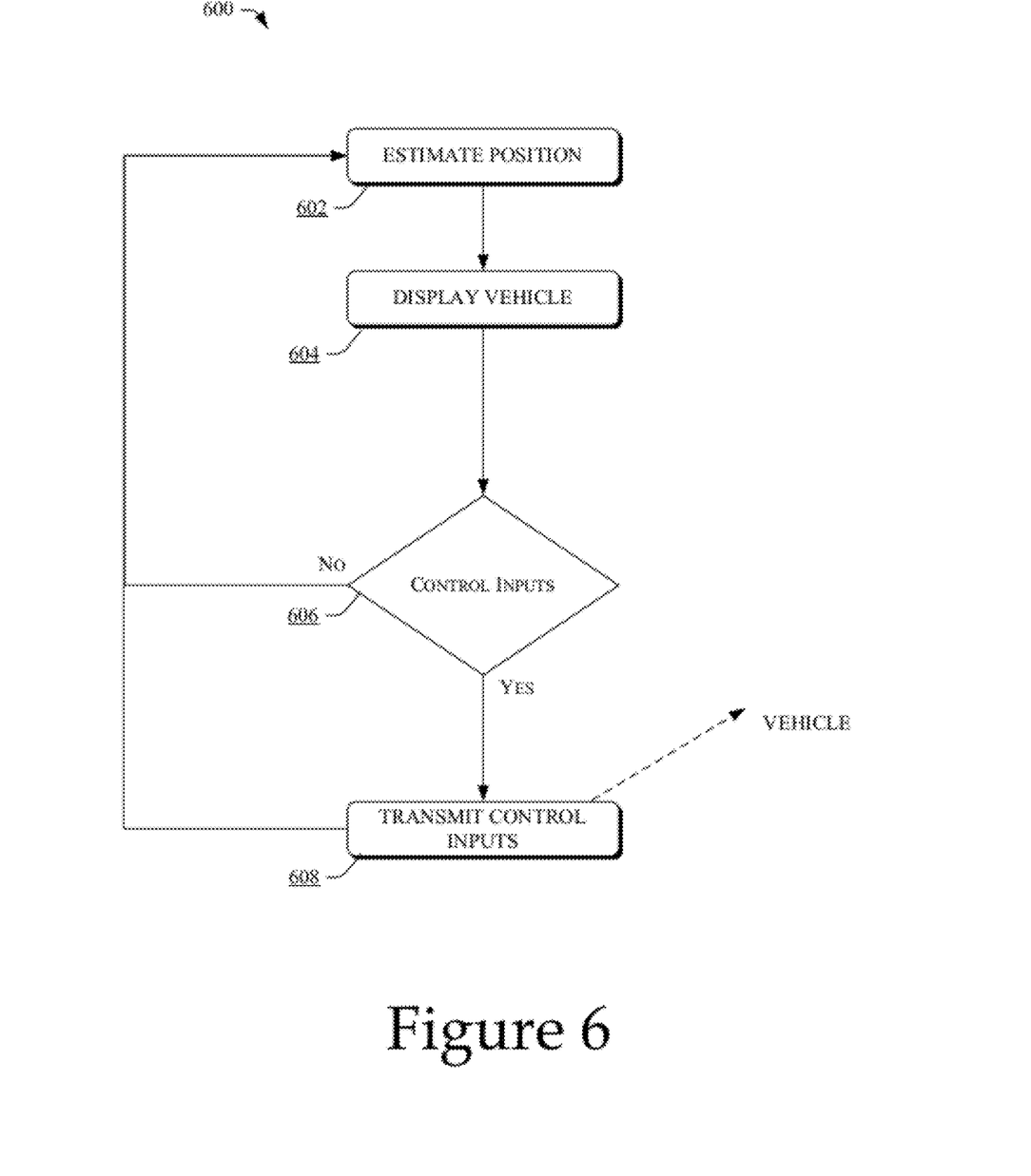
FIG. 6 is a flow diagram illustrating a process for controlling a vehicle.

FIGS. 4-6 illustrate processes pertaining to remotely controllable vehicles. The illustrative processes are depicted as a collection of blocks in a logical flow graph, which represent a sequence of operations that can be implemented in hardware, software, or a combination thereof. In the context of software, the blocks represent computer-executable instructions that, when executed by one or more processors, cause the one or more processors to perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process.

FIG. 4 illustrates a process 400 for communicating a position of a vehicle. The process 400 may be performed, at least in part, by the system architecture of FIG. 1. For example, the process 400 may be performed by a vehicle such as the remotely operable vehicle 102 of FIG. 1 to communicate a position of the remotely operable vehicle. At 402, the vehicle obtains location, orientation, and kinematic data of the vehicle. In one implementation, such as with a GPS supplemented with an Inertial Navigation System (INS), the vehicle obtains current location and orientation measurements as well as linear and angular velocities and accelerations. Additionally, the vehicle may obtain a time stamp indicating a corresponding time for the location, orientation, and kinematic data. The location, orientation, and kinematic data may be saved as a data package along with the time stamp, and may be used to initialize the position estimating algorithms used in 404. At 404, the vehicle's position is estimated. In one implementation, an algorithm such as the dead reckoning algorithm described above estimates the location and orientation of the vehicle at 404 based initially on the location, orientation, and kinematic data obtained at 402. With each iteration through the estimate position module 404, the elapsed time since the previous iteration is used in the position estimating algorithm to estimate where the vehicle may be positioned at that point in time. At 406, an actual position of the vehicle is acquired. In one implementation, a GPS supplemented with an INS acquires the actual location, orientation, and kinematic data of the vehicle at 406 as described above.

At 408, a determination is made as to whether a difference between the estimated position of vehicle (i.e. 404) and the acquired position of the vehicle (i.e. 406) is greater than a predetermined threshold. If the difference between the estimated position of the vehicle and the acquired position of the vehicle is greater than a predetermined threshold (i.e., the "Yes" branch from 408), then updated location, orientation, and kinematic data of the vehicle is obtained at 410. The same technique utilized at 402 and 406 may obtain the updated orientation and kinematic data at 410. For example, at 410, the vehicle's current location and orientation measurements, linear and angular velocities and accelerations, and a time stamp indicating a time of the position readings may be obtained. In another example, the updated data obtained in 406 may be used directly. The updated location, orientation, and kinematic data may be saved as a data package at 412. At 414, the updated location, orientation, and kinematic data packet (i.e. 412) may be transmitted.

Although FIG. 4 shows the vehicle transmitting the data packet when the difference between the estimated position of the vehicle and the acquired position of the vehicle is greater than a predetermined threshold (i.e., the "Yes" branch from 408), other methods may be used in addition to 408 to trigger the transmission of the data packet. For example, the data packet may also include a heartbeat timer such that if the vehicle has not sent a data packet within a specific time interval, such as two seconds, the vehicle may automatically proceed with sending the data packet anyway so that the recipient of the data packet knows that the vehicle is still alive. A second specific time period may be used along with the heartbeat timer to indicate that the vehicle is non-operational. For example, if the operator fails to receive the data packet within 2.5 times the heartbeat interval, for example, then the operator may consider the vehicle non-operational.

In one implementation, the updated location, orientation, and kinematic data packet is transmitted to a remote operator at 414 via the communication link described above (and depicted in FIG. 4 as a dashed line). The updated location, orientation, and kinematic data packet may be transmitted at 414 to a remote operator such as the remote operator 104 of FIG. 1. If multiple vehicles are provided, the updated location, orientation, and kinematic data packet generated at 412 may be transmitted to one or more other vehicles at 414 in addition to transmitting the data packet to the remote operator.

Once the location, orientation, and kinematic data packet is transmitted at 414, the vehicle uses the updated location, orientation, and kinematic data from 410 to reset and reinitialize the position estimation algorithms in 404 and may continue the iterative process of updating the estimated position based on the time elapsed from the previous iteration, and to compare the updated estimated position of vehicle to the acquired position of the vehicle at 408 using the updated location, orientation, and kinematic data of the vehicle obtained at 406.

If the difference between the estimated position of vehicle and the acquired position of the vehicle is not greater than a predetermined threshold (i.e., the "No" branch from 408), then the vehicle may continue to update the estimated position based on the elapsed time since the previous iteration, and compare the updated estimated position of vehicle and the acquired position of the vehicle at 408 using the location and orientation data estimated in 404 and a newly acquired position of the vehicle at 406.

FIG. 5 illustrates a process 500 for displaying a position of a vehicle. The process 500 may be performed, at least in part, by the system architecture 100 of FIG. 1. For example, the process 500 may be performed by an operator such as the remote operator 104 of FIG. 1 to display a virtual representation of a vehicle. At 502, an estimation technique estimates the vehicle's position. In one implementation, an estimation algorithm such as the dead reckoning algorithm described above may estimate the vehicle's position at 502. For example, the same dead reckoning algorithm described above with reference to element 404 estimates the position of the vehicle at 502.

At 504, a virtual representation of the vehicle is displayed based on the estimated position of the vehicle. In one implementation, the virtual representation of the vehicle may be displayed along with one or more virtual environment measurements as described above.

At 506, a determination is made as to whether a data packet is received from the vehicle. In one implementation, the received data packet may be the data packet described at 412 above with respect to FIG. 4. For example, the received data package may consist of the vehicle's current position measurements, linear and angular velocities and accelerations, and a time stamp indicating a time of the position readings. If a data packet is received from the vehicle (i.e., the "Yes" branch from 506), then the technique used to estimate the position of the vehicle at 502 may be updated at 508 based on the data stored in the received data packet. In one implementation, the vehicle's position measurements, linear and angular velocities and accelerations stored in the received data packet may be used to update one or more variables of the position estimation technique of 502. In a further implementation, a time stamp stored in the received data packet may be used to further update the position estimation technique of 502. Using a time stamp to update the position estimation technique of 502 advantageously accounts for any latency in the transmission of the received data packet.

Once the technique used to estimate the position of the vehicle is updated at 508, the operator may continue to display the vehicle at 504 based on the last received data packet of 506. If a data packet is not received from the vehicle (i.e., the "No" branch from 506), then the operator may continue to display the vehicle at 504 without updating the position estimation technique of 502.

FIG. 6 illustrates a process 600 for controlling a vehicle. The process 600 may be performed, at least in part, by the system architecture 100 of FIG. 1. For example, the process 600 may be performed by an operator such as the remote operator 104 of FIG. 1 to control the remotely operable vehicle 102 of FIG. 1. At 602, a position estimation technique estimates the vehicle's position. In one implementation, a dead reckoning algorithm such as described above with respect to FIG. 4 estimates the position of the vehicle at 602 based on location, orientation, and kinematic data stored in a data packet received from the vehicle. The dead reckoning algorithm may take into account data packet transmittal latency using a data packet time stamp reflecting a generation time of the data packet.

At 604, a virtual representation of the vehicle is displayed based on the position of the vehicle estimated at 602. In one implementation, the virtual representation of the vehicle may be displayed along with one or more virtual environment measurements as described above. For example, one or more measurements may be retrieved from a virtual environment database to display on the display device along with the virtual representation of the vehicle.

At 606, a determination is made as to whether to transmit any control inputs to the vehicle. In one implementation, the determination of 606 is based on the displayed vehicle of 604. If control inputs are to be transmitted to the vehicle (i.e., the "Yes" branch from 606), then the control inputs are transmitted to the vehicle at 608. In one implementation, a human operator determines whether to transmit any control inputs to the vehicle at 606. Alternatively, an automate technique may determine whether to transmit any control inputs to the vehicle at 606. In one implementation, the operator transmits the control inputs to the vehicle at 608 via the communication link 114 described above in FIG. 1 (and depicted in FIG. 6 as a dashed line). The control inputs may be acquired using a controller device. For example, as often used in video games, an operator may manipulate a controller device such as a joystick, such that an accelerometer of the joystick captures the operator's commands as one or more of location, orientation, and kinematic data. Alternatively, a computer may generate the control inputs using a software program. Alternatively, a user may input the control inputs directly in terms of location, orientation, and kinematic data.

In one implementation, the operator may package the control inputs in a control input data packet to send to the vehicle 608. The control input data packet may additionally include a time stamp reflecting the time that the control inputs are intended to represent. The time stamp could be the current time of the operator generating the control input data packet to send to the vehicle, but it could also include a lookahead time differential so that the data of the control input data packet represents data slightly in the future of when the control input data packet was generated to compensate for transmission delays in reaching the recipient, such as vehicle 608. Sending the control input data packet including the time stamp advantageously enables the vehicle to use a dead reckoning algorithm to extrapolate the data of the control input data packet. For example, if the vehicle calculates, based on the time stamp of the control input data packet, that it took 100 milliseconds to transmit the control input data packet from the operator to the vehicle, the vehicle may use dead reckoning to extrapolate the 100 millisecond old data of the control input data packet to a current set of input data. This advantageously enables the model of the operator's controller that the vehicle is maintaining at a given instant can almost exactly match the actual location of the operator's controller even though there was latency in the data packet containing the control inputs. In such an implementation, the vehicle does not respond directly to the control position sent by the operator; rather, it responds to the control position of its dead reckoned model of the operator's control inputs that have been compensated for with respect to latency.

Use of a model of the control inputs, such as with a dead reckoned control input model, on both the sending and receiving sides of the control input data message advantageously allows a reduction in network bandwidth utilization by only sending the message when an agreed upon error threshold has been exceeded, at which time the control input data message may be transmitted, and the control input models on both ends are reset to the actual position of the control input.

If the control input data packet contains a time stamp reflecting the time that the control inputs are intended to represent, the control input data packet may also include a heartbeat timer as described above with reference to FIG. 4. For example, if the operator hasn't sent a control input data packet within a specific time interval, such as two seconds, the operator may automatically proceed with sending the control input data packet anyway so that the vehicle knows that the operator is still alive. A second specific time period may be used along with the heartbeat timer to indicate that the operator is non-operational. For example, if the vehicle fails to receive a control input data packet within 2.5 times the heartbeat interval, for example, then the vehicle may consider the operator non-operational.

If multiple vehicles are provided, the operator may send control inputs to one or more vehicles. In one implementation, the operator may transmit the same control inputs to a plurality of vehicles at 608 such that the plurality of vehicles operate in synchronicity with each other. Alternatively, the operator may transmit unique control inputs to each of the vehicles at 608 to independently operate the plurality of vehicles.

Once the control inputs are transmitted to the vehicle at 608, the operator may continue to display the vehicle at 604 based on a newly estimated position of the vehicle at 602. If control inputs are not to be transmitted to the vehicle (i.e., the "No" branch from 606), then the operator may continue to display the vehicle at 604 based on a newly updated estimated position of the vehicle at 602.

Illustrative Collaborative System Architecture

FIG. 7 is a combined block and flow diagram of a system architecture 700 for collaboratively controlling multiple remotely controllable vehicles. The system architecture 700 may include a first remotely operable vehicle 702 and a second remotely operable vehicle 704. Although FIG. 7 shows the remotely operable vehicle 702 identical to remotely operable vehicle 704, remotely operable vehicles 702 and 704 may be different vehicles. Remotely operable vehicles 702 and 704 may be any vehicle that is remotely controllable such as aircraft, maritime vessels, spacecraft, motor vehicles, or the like.

In general, remotely operable vehicles 702 and 704 may include one or more processor(s) as described above with reference to the remotely operable vehicle 102 of FIG. 1. For example, FIG. 7 shows a processor 706 for remotely operable vehicle 702 and a processor 708 for remotely operable vehicle 704. As described above with reference to the remotely operable vehicle 102 of FIG. 1, remotely operable vehicles 702 and 704 may include one or more instances of computer-readable storage media, which are coupled to communicate with the processors 706 and 708 respectively. For example, FIG. 7 shows computer-readable storage media 710 for remotely operable vehicle 702 and computer-readable storage media 712 for remotely operable vehicle 704.

Computer-readable storage media 710 and 712 may include estimated position modules 714 and 716 respectively. Estimated position module 714 may estimate a position of the first remotely operable vehicle 702 as well as estimate a position of the second remotely operable vehicle 704. Similarly, estimated position module 716 may estimate a position of both remotely operable vehicle 702 and remotely operable vehicle 704. Although FIG. 7 only shows two remotely operable vehicles, more than two remotely operable vehicles may be provided such that the estimated position modules 714 and 716 estimate a position of each of the remotely operable vehicles.

As discussed above with reference to the vehicle based estimated position module 202 in FIG. 2, estimated position modules 714 and 716 may use any position estimation algorithm to estimate the position of the remotely operable vehicles 702 and 704. In one non-limiting implementation, estimated position modules 714 and 716 may use a dead reckoning algorithm to estimate the position of the remotely operable vehicles 702 and 704. In such an implementation, the dead reckoning algorithm may estimate the remotely operable vehicle's position based on orientation and kinematic data obtained from the vehicle. In one implementation, the estimated position modules 714 and 716 continuously estimate the position of the remotely operable vehicles 702 and 704.

Computer-readable storage media 710 and 712 may further include acquired position modules 718 and 720 respectively. Acquired position module 718 may acquire a position of remotely operable vehicle 702 and acquired position module 720 may acquire a position of remotely operable vehicle 704. As discussed above with reference to the acquired position module 206 of FIG. 2, any position acquisition technique may acquire a position of the vehicle. In one non-limiting implementation, acquired position modules 718 and 720 may use a GPS augmented with an INS technique to acquire the position of the vehicle.

Computer-readable storage media 710 and 712 may further include communication modules 722 and 724 respectively to generate and communicate a position data packet based on a comparison of the estimated and actual positions of the vehicle. For example, remotely operable vehicle 702 may compare its estimated position to its acquired position. When the acquired position of remotely operable vehicle 702 differs from the estimated position by more than a threshold value, communication module 722 may generate a position data packet. Similarly, remotely operable vehicle 704 may generate a position data packet when its acquired position differs from its estimated position by more than a threshold value. In some instances, the threshold values for remotely operable vehicles 702 may be equal to the threshold values for remotely operable vehicles 704, but in other instances the threshold value may be different.

Upon generation of the position data packet, the communication modules 722 and 724 may communicate the position data packet. In one implementation, communication modules 722 and 724 communicate the position data packets to a remote operator such as the remote operator 104 of FIG. 1. Alternatively, communication module 722 may communicate a position data packet to the second remotely operable vehicle 704. For example, communication modules 722 may communicate the position data packet to the second remotely operable vehicle via communication link 726. Similarly, communication modules 724 may communicate a position data packet to remotely operable vehicle 702 via communication link 726. Although FIG. 7 only shows two remotely operable vehicles, more than two remotely operable vehicles may be provided such that communication modules 722 and 724 communicate the data packets to all of the remotely operable vehicles via communication links among all of the remotely operable vehicles. In a further alternative embodiment, communication modules 722 and 724 may communicate the position data packets to a remote operator such as the remote operator 104 of FIG. 1 as well as to any other remotely operable vehicle(s).

As discussed above with reference to the position data packet 212 of FIG. 2, the position data packets of FIG. 7 may include current location, orientation, and kinematic data of the vehicle including linear and rotational velocity and acceleration data. The position data packets may further include a time stamp reflecting a time that the communication modules 722 and 724 generate the position data packets.

Computer-readable storage media 710 and 712 may further include position update modules 728 and 730 respectively to update an estimated position of the remotely operable vehicles 702 and 704. For example, position update module 728 may update an estimated position of remotely operable vehicle 702 based on the position data packet of the communication module 722 when the acquired position of remotely operable vehicle 702 differs from the estimated position of remotely operable vehicle 702 by more than a threshold value. Position update module 728 may additionally update an estimated position of the second remotely operable vehicle 704 based on a receipt of a position data packet from communication module 724. Although FIG. 7 only shows two remotely operable vehicles, more than two remotely operable vehicles may be provided such that position update modules 728 and 730 update the estimated position of each of the remotely operable vehicles upon receipt of a position data packet from each of the remotely operable vehicles.

Computer-readable storage media 710 and 712 may further include command modules 732 and 734 to receive one or more operational commands. In one implementation, the command modules 732 and 734 receive the one or more operation commands from other remotely operable vehicles. For example, command module 732 may receive one or more operation commands from remotely operable vehicle 704. Alternatively, the command modules 732 and 734 receive the one or more operation commands from a remote operator such as the remote operator 104 of FIG. 1. In a further alternative illustration, command modules 732 and 734 may receive the one or more operation commands from either or both another remotely operable vehicle and/or a remote operator. In one implementation, command modules 732 and 734 receive the one or more operation commands via the communication link 726. Alternatively, command modules 732 and 734 may receive the one or more operation commands via another route.

Computer-readable storage media 710 and 712 may further include control modules 736 and 738 to control a trajectory of the remotely operable vehicles. For example, control module 736 may control a trajectory of remotely operable vehicle 702. Control module 736 may additionally control the trajectory of another other remotely operable vehicles such as remotely operable vehicle 704. Similarly, control module 738 may control a trajectory of both remotely operable vehicle 704 as well as control a trajectory of remotely operable vehicle 702.

In one implementation, control modules 736 and 738 may control the trajectory of the remotely operable vehicles by computing the trajectory within a virtual representation of the remotely operable vehicles in a virtual environment. For example, control module 736 may compute a trajectory within a virtual representation of both remotely operable vehicle 702 and remotely operable vehicle 704 along with a virtual representation of the environment in which remotely operable vehicles 702 and 704 are operating. In one implementation, control modules 736 and 738 may obtain virtual representations of the remotely operable vehicles from a vehicle measurement database such as the vehicle measurement database 118 discussed above with respect to FIG. 1.

Although FIG. 7 only shows two remotely operable vehicles, more than two remotely operable vehicles may be provided such that control modules 736 and 738 display all of the remotely operable vehicles together on the display device at the same time.

Conclusion

While preferred and alternate embodiments of the disclosure have been illustrated and described, as noted above, many changes can be made without departing from the spirit and scope of the disclosure. Accordingly, the scope of the disclosure is not limited by the disclosure of these preferred and alternate embodiments. Instead, the disclosure should be determined entirely by reference to the claims that follow.

What is claimed is:

1. A remotely operable vehicle collaboration system architecture, comprising:
   a first remotely operable vehicle, the first remotely operable vehicle comprising:
   a first vehicle estimated position module to estimate a position of the first vehicle;
   a first vehicle acquired position module to acquire a position of the first vehicle;
   a first vehicle communication module to communicate a first vehicle position data packet when a difference between the estimated position of the first vehicle and the actual position of the first vehicle is greater than a first position deviation threshold;

a first vehicle position update module to update the estimated position of the first vehicle based on the first vehicle position data packet;

a first vehicle command module to receive one or more operational commands; and a first vehicle control module to control a trajectory of the first vehicle; and a second remotely operable vehicle, the second remotely operable vehicle comprising:

a second vehicle estimated position module to estimate a position of the first vehicle and to further estimate a position of the second vehicle;

a second vehicle acquired position module to acquire a position of the second vehicle;

a second vehicle communication module to communicate a second vehicle position data packet to at least the first vehicle when a difference between the estimated position of the second vehicle and the actual position of the second vehicle is greater than a second position deviation threshold;

a second vehicle position update module to update the estimated position of the second vehicle based on the second vehicle position data packet when the estimated position of the second vehicle and the actual position of the second vehicle is greater than the second position deviation threshold, the second vehicle position update module further to update the second vehicle's estimated position of the first vehicle based on a receipt of the first vehicle position data packet;

a second vehicle command module to receive one or more operational commands; and a second vehicle control module to control a trajectory of the second vehicle.

2. The system architecture of claim 1, wherein the second vehicle estimated position module estimates the position of the first vehicle and estimates the position of the second vehicle using a single dead reckoning algorithm.

3. The system architecture of claim 1, wherein the first vehicle command module and the second vehicle command module receives the one or more operational commands from a remote operator.

4. The system architecture of claim 1, wherein the first vehicle command module exchanges operational commands with the second vehicle command module.

* * * * *